G. D. BURTON.
PROCESS OF TREATING VEGETABLE MATTER.
APPLICATION FILED OCT. 22, 1906. RENEWED APR. 1, 1910.

976,037.

Patented Nov. 15, 1910.

3 SHEETS—SHEET 1.

Witnesses:
Nathan C. Lombard
Howard Hanscom

Inventor:
George D. Burton,
by Walter E. Lombard.
Atty.

UNITED STATES PATENT OFFICE.

GEORGE D. BURTON, OF BOSTON, MASSACHUSETTS.

PROCESS OF TREATING VEGETABLE MATTER.

976,037.  Specification of Letters Patent.  Patented Nov. 15, 1910.

Application filed October 22, 1906, Serial No. 339,939. Renewed April 1, 1910. Serial No. 552,904.

*To all whom it may concern:*

Be it known that I, GEORGE D. BURTON, a citizen of the United States of America, and a resident of Boston, in the county of Suffolk and State of Massachusetts, have invented certain new and useful Improvements in Processes of Treating Vegetable Matter, of which the following is a specification.

This invention relates to a process of treating vegetable matter to place it in condition for commercial use and at the same time secure therefrom such by-products as the matter treated may contain.

The invention consists in a certain novel treatment of the vegetable matter, by its immersion in various solutions while subjected to the action of an electric current, and the production thereby of certain gaseous vapors, which are passed through a suitable condenser, and the distillate therefrom collected in a suitable receptacle.

The invention further consists in certain novel features in connection with the aforesaid process which will be thoroughly understood by reference to the description of the drawings and to the claims hereinafter given.

Figure 1:
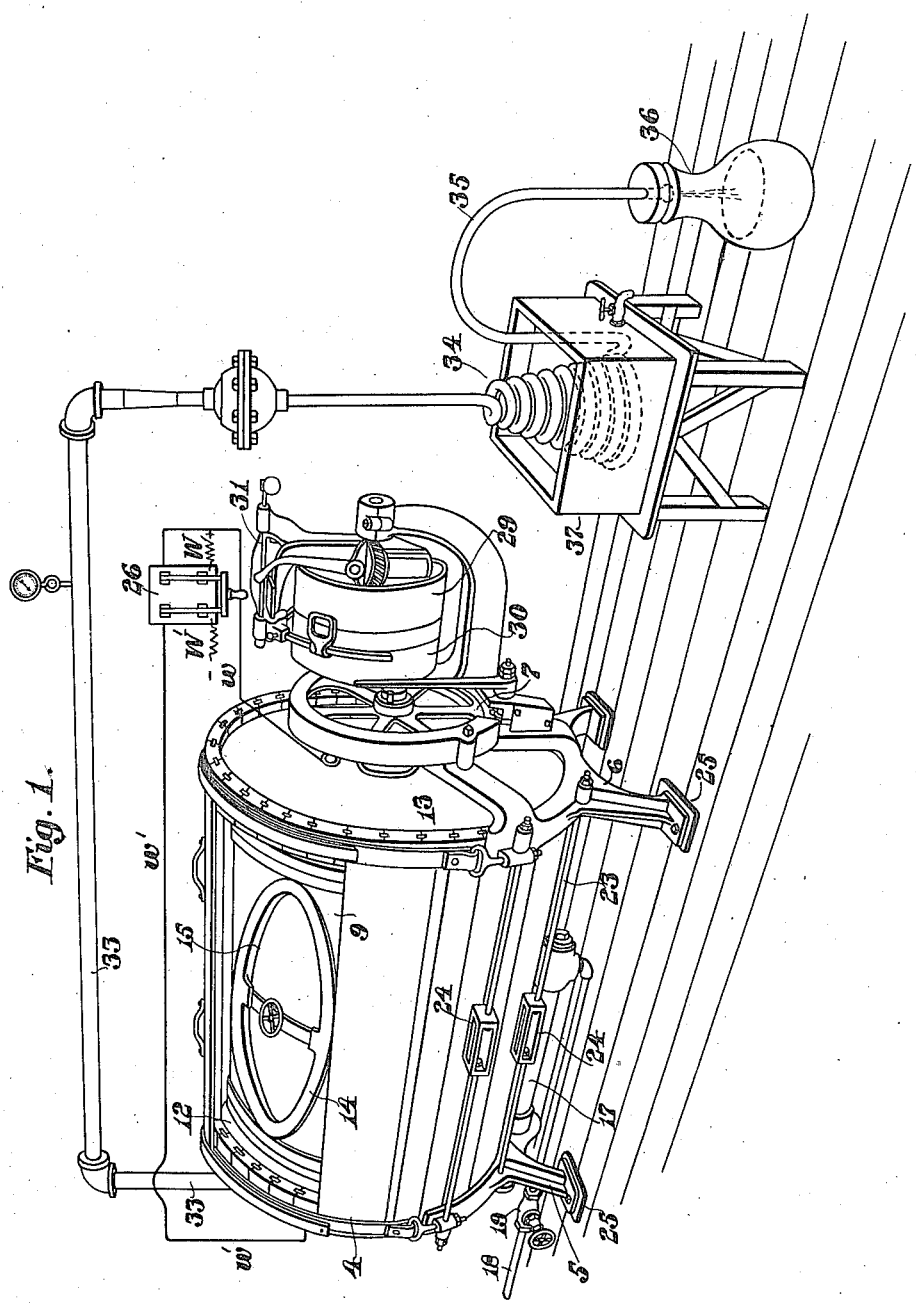
Figure 2:
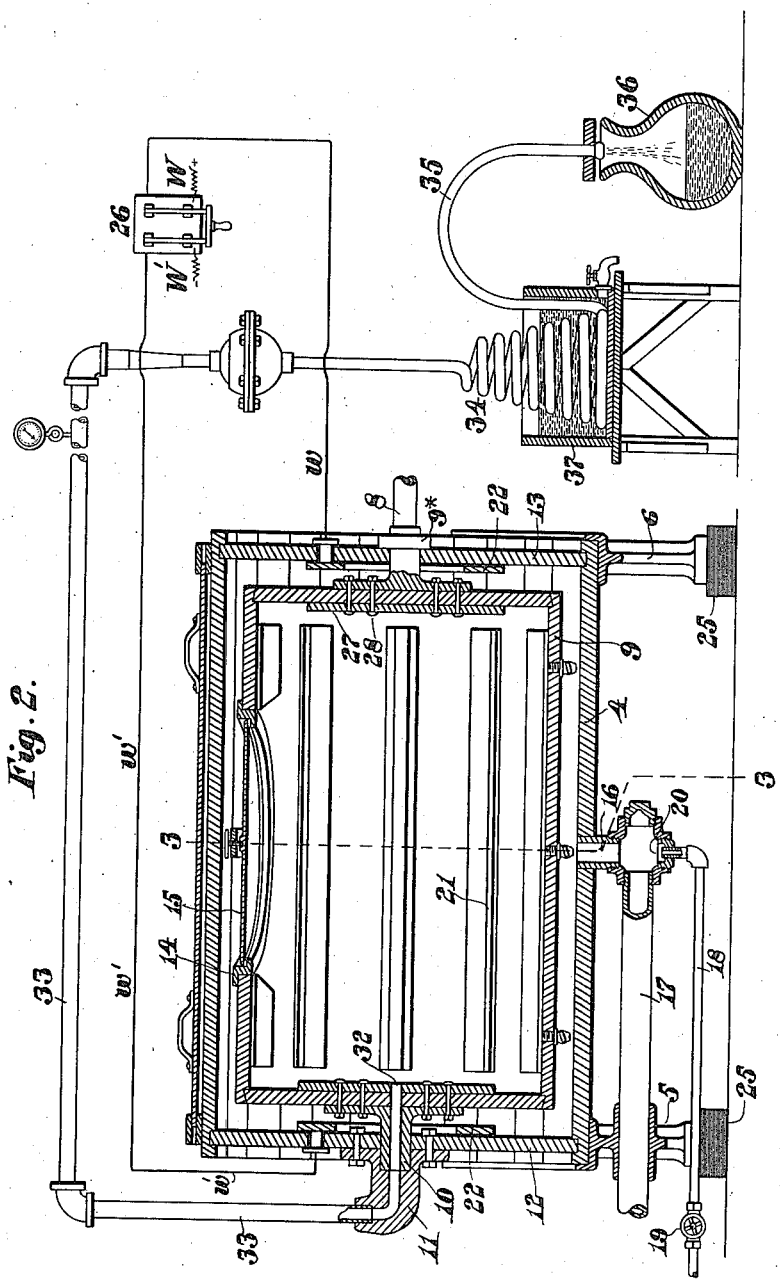
Figure 3:
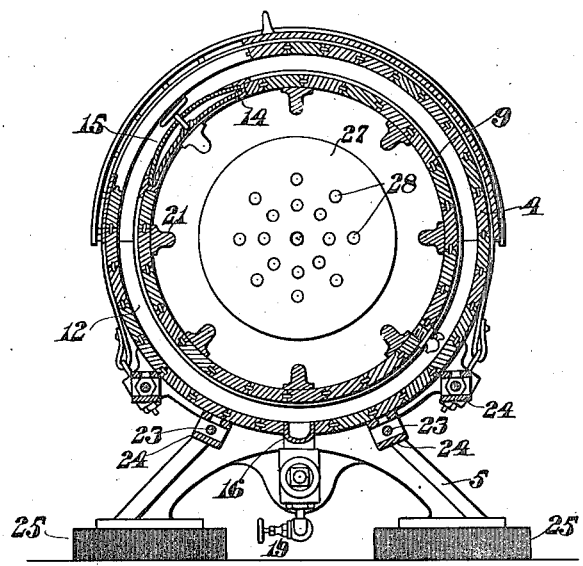
Figure 4:
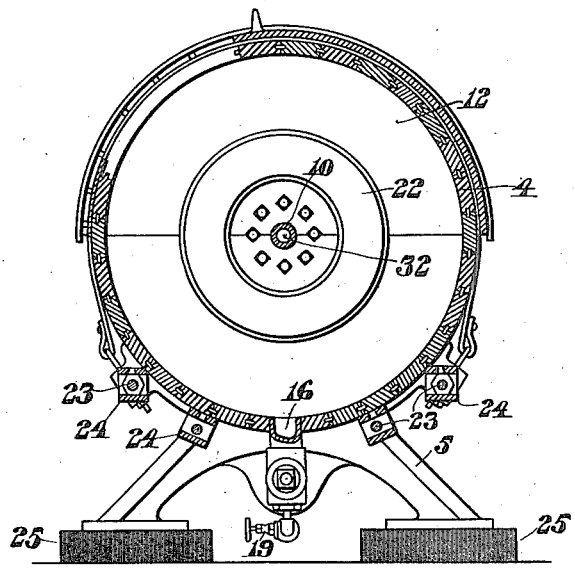

In the drawings an apparatus is shown capable of carrying out the process, of which drawings, Figure 1 represents a perspective view of the complete apparatus. Fig. 2 represents a longitudinal section of the same. Fig. 3 represents a transverse section on line 3—3 on Fig. 2, looking in the direction of the arrow, and Fig. 4 represents a similar view with the inner receptacle removed but the trunnion thereof shown in section.

Similar characters designate like parts throughout the several figures of the drawings.

The apparatus consists of a stationary barrel-shaped tank 4 mounted upon castings or other suitable supports 5—6. The casting or support 6 serves also as a frame for supporting the driving mechanism which includes a spur gear 7 mounted upon a trunnion 8 secured to one end of a revoluble receptacle 9 contained within said tank 4. The trunnion 8 is mounted in a suitable bearing 9* secured to the outer face of the tank 4. The opposite head of the revoluble receptacle 9 is provided with a similar trunnion 10. The trunnion 10 is adapted to rotate in a suitable bearing 11 secured to the outer face of the head 12 of the tank 4. The tank 4 is made in two sections, the heads 12 and 13 being divided horizontally (see Fig. 4) one-half of the staves being fastened to the lower sections of the heads and the other half to the upper section of the heads so that the upper half of the tank 4 may be removed to allow the revoluble receptacle 9 to be placed in position.

The receptacle 9 is provided with an opening in the peripheral wall thereof, this opening being provided with an annular flanged rim 14 set therein. Fitting the depressed portion of said annular rim 14 is a suitable closure 15.

The tank 4 is provided with an inlet nozzle 16 extending vertically into the bottom thereof and this inlet 16 communicates with a horizontal pipe 17 through which a suitable solution may be supplied to said tank or drawn therefrom, as desired. A steam pipe 18 provided with a valve 19 communicates with the inlet nozzle 16 at 20 said steam inlet being in axial alinement with the solution inlet 16. When the solution settles in the bottom of the tank 4 and tends to clog the supply inlet, by operating the valve 19, a desired amount of steam may be discharged from said nozzle 20 to remove the obstruction from the inlet 16. This discharge of steam may continue during the entire operation or be made at intervals as desired.

The revoluble receptacle 9 is provided with a plurality of inwardly projecting members 21 which serve as agitators and cause the contents of the cylinder to be thoroughly mixed during the revolution of said receptacle.

At either end of the tank 4 is secured an annular electrode 22 surrounding the trunnions 8 and 10. These electrodes 22 are connected to the inner face of the heads 12 and 13 of said tank and are connected on the outer face of said tank with the service wires *w—w'*.

The end castings 5 and 6 are connected to each other by bolts 23 connected midway between the heads of said receptacle by insulating members 24 of any ordinary construction, while said end castings or supports are mounted upon insulating plates 25 to prevent the current from passing through the floor of the building in which the apparatus is housed. A switch 26 of any ordinary construction is used for connecting the service lines W—W' with the apparatus.

The revoluble receptacle 9 has the inner face of each of its heads provided with a suitable electrode 27 secured thereto by means of a plurality of bolts 28 passing through said head.

The pipe 17 is provided with a suitable valve (not shown) and when it is desired to treat any substances in the apparatus a suitable saponaceous solution such as water and castile soap is passed through said pipe into the tank, filling the same to a point just below the trunnions. This saponaceous solution has added to it a sufficient quantity of electrolytic salts such as oxalic acid or acetic acid for the purpose of increasing the gravity of the solution. A sufficient quantity of solution is admitted to the interior of the inner receptacle 9 and when this has been done the vegetable fibers desired to be treated are immersed therein. While the vegetable matter is immersed in this solution it is subjected to the action of a current of electricity of proper voltage and amperage, said electricity passing from one electrode 27 to that upon the opposite head of the inner receptacle 9, the resistance of the solution being sufficient to cause the electricity to pass through the vegetable matter contained therein. This direct action may continue during the entire time of immersion or during only a portion of the time, as may be desired. When a sufficient quantity of solution has been supplied to the tank the valve is shut off. This solution may be heated by opening the valve 19 and supplying steam to the tank. The apparatus is then set in motion by means of a suitable belt (not shown) communicating with the fast and loose pulleys 29—30 so that the inner receptacle 9 is rotated first in one direction and then in another by the automatic reversing mechanism 31. The switch 26 is then closed to cause a current of electricity to pass to one of the electrodes 22. The current passing to one of these electrodes 22 will pass through the solution contained within the tank 4 and through the bolts 28 to one of the electrodes 27. The articles or substances to be treated are immersed in said saponaceous solution in the inner receptacle 9 which solution is provided with sufficient salts such as oxalic acid or acetic acid to increase the specific gravity of the solution, and also affording increased resistance to the same sufficient to cause an electric current to more advantageously act. The electric current passes from one electrode 27 through the substances immersed to the other electrode 27, and then through the bolts 28 and the solution in the outer tank 4 to the other electrode 22 and from this to the service wire $w'$. The resistance of the solution to the current of electricity is sufficient to cause the current to pass through the substances contained therein and in so doing acts in various manners upon the substances contained within the inner receptacle, depending on the nature of the solution and the articles or substances immersed therein. The action of the solution upon the vegetable matter will cause the fibers thereof to be materially softened and strengthened and at the same time cleaned and bleached. When vegetable matter is being thus cleaned and bleached any acid which is obtained from a vegetable substance and which has an affinity for the vegetable matter being treated secures better results than could otherwise be obtained. During the treatment of the vegetable matter contained within the inner receptacle this is revolved on the trunnions 8—10 first in one direction and then in the other to secure a suitable agitation of the contents of said receptacle. After the vegetable substance has been thus treated in the saponaceous solution it is then immersed in an oily solution in a similar tank or in the same tank after the solution has been changed. This oily solution is preferably composed of animal oil or greases and causes the vegetable fibers thereof to be strengthened and softened. During the immersion of the vegetable fibers in the oily solution it is subjected to the action of a current of electricity. When the fibers have been thoroughly softened and strengthened by immersion in animal oil the matter is removed from the solution and dried or partially dried after which the matter is again subjected to an immersion in a soapy solution combined with oxalic acid which has a tendency to further bleach or whiten the fibers and at the same time increase the strength thereof. Any vegetable matter having fibers, by such treatment, can be thoroughly degummed and put into commercial shape without being required to pass through a fiberating or a decorticating machine but with some fibers it may be preferable after they have been thus treated to subject them to treatment by either a fiberating or decorticating machine as such treatment has a tendency to sub-divide the fibers and eliminate all of the short or waste fibers, especially if the fiber is of considerable length.

While this process may be carried out without the aid of electricity the use of electricity during the process is preferable as a much better cleansing effect is secured and the completion of the process is hastened while at the same time the gas created by the action of the electricity upon the chemical salts contained within the solution has a tendency to open and expand the fibers and strengthen them.

During the operation, the action of electricity upon the vegetable matter contained within the various solutions causes gases to be generated. The gaseous vapors generated during the process escape through a passage 32 into the pipe 33 through which the vapors pass into a condenser 34 and from this through a pipe 35 into a receptacle 36. The condenser consists of a suitable coil submerged in a cooling liquid in a suitable tank 37. The volatile gases are condensed within this condenser 34 and the distillate secured therefrom is collected in the receptacle 36. The nature of the distillate collected in the receptacle 36 will depend entirely upon the kind of vegetable matter treated, as, for instance, if palmetto was being treated a distillate of palmetto would be secured suitable for tanning. It is obvious that the various substances treated will give a different distillate which can be collected and deposited in the receptacle 36.

Many of the fibrous grasses, leaves of plants, trees, etc., contain either in the green or dried state more or less of the substance known in the trade as gum and before such fibrous matter is capable of use commercially it is necessary to eliminate the gum and this must be done in order to successfully fiberate or decorticate such material. Where the vegetable matter contains acids these also must be eliminated from the fibrous matter before such matter can be successfully used commercially. By treating these vegetable matters to the process herein described such gums and acids are readily withdrawn from the vegetable matter and the fibers thereof are caused to assume a condition where they may be successfully used for various commercial purposes. At the same time the process in operating to remove the gum and acids from the vegetable matter by the action thereon will cause certain gases or by-products to be formed which it is very desirable to save as these by-products may also be used for various commercial purposes. In order to secure a particularly soft and strong fiber to the vegetable matter treated the substances are immersed in a third solution consisting of water, castile soap, and suitable spirits such as alcohol, bay rum, or high wines, which will soften the fibers very materially and at the same time strengthen them. In the present process means are provided whereby these gases and by-products are saved and utilized. At the same time the fibers are being acted upon to place them in condition to be used commercially. For instance, the gum of the stalk or leaves of the banana are very useful both as a fertilizer and in the arts while the gum from many other fibers is useful as a coloring matter such as for water colors.

By treating the vegetable fibers to the process herein outlined the strength of the fibers is very greatly increased and such fibers when properly cleaned are capable of use in the arts in the manufacture of nets, fish lines, mats, hats, rope, etc.

By the use of a process such as is herein outlined, vegetable matter heretofore considered useless may be treated so that all the parts thereof may be placed in condition to be utilized for various commercial purposes.

Having thus described my invention, I claim:

1. The process of treating vegetable matter, which consists in subjecting it to the action of a saponaceous solution containing an electrolytic chemical acid; then subjecting said solution and the matter contained therein to the action of an electric current; then subjecting said matter to the action of an oily solution; and then again subjecting it to the action of a saponaceous solution.

2. The process of treating vegetable matter, which consists in subjecting it to the action of a saponaceous solution containing an electrolytic chemical acid; then subjecting said solution and the matter contained therein to the action of an electric current; then subjecting said matter to the action of an oily solution; then again subjecting it to the action of a saponaceous solution; and then immersing the matter in a solution consisting of water and spirits.

3. The process of treating vegetable matter, which consists in subjecting it to the action of a saponaceous solution containing an electrolytic chemical acid; then subjecting said solution and the matter contained therein to the action of an electric current; then subjecting said matter to the action of an oily solution; then again subjecting it to the action of a saponaceous solution; and then immersing said matter in a solution consisting of water, castile soap, and spirits.

4. The process of treating vegetable matter, which consists in immersing it in a saponaceous solution containing an electrolytic chemical acid; subjecting said solution and the matter contained therein to the action of an electric current; then immersing said matter in an oily solution; and then again immersing it in a saponaceous solution.

5. The process of treating vegetable matter, which consists in immersing it in a saponaceous solution containing an electrolytic chemical acid; subjecting said solution and the matter contained therein to the action of an electric current; then immersing said matter in an oily solution; then again immersing it in a saponaceous solution; and then immersing said matter in a solution consisting of water and spirits.

6. The process of treating vegetable matter, which consists in immersing it in a saponaceous solution containing an electrolytic chemical acid; subjecting said solution and the matter contained therein to the action of an electric current; then immersing said matter in an oily solution; then again immersing it in a saponaceous solution; and then immersing said matter in a solution consisting of water, castile soap, and spirits.

7. The process of treating vegetable matter, which consists in immersing it in a saponaceous solution containing an electrolytic chemical acid; subjecting said solution and the matter contained therein to the action of an electric current; then immersing said matter in an oily solution; then immersing it in a saponaceous solution; and then subjecting said solution and matter to the action of an electric current.

8. The process of treating vegetable matter, which consists in immersing it in a saponaceous solution containing an electrolytic chemical acid; subjecting said solution and the matter contained therein to the action of an electric current; then immersing said matter in an oily solution; then immersing it in a saponaceous solution; then subjecting said solution and matter to the action of an electric current; and then immersing said matter in a solution consisting of water and spirits.

9. The process of treating vegetable matter, which consists in immersing it in a saponaceous solution containing an electrolytic chemical acid; subjecting said solution and the matter contained therein to the action of an electric current; then immersing said matter in an oily solution; then immersing it in a saponaceous solution; then subjecting said solution and the matter to the action of an electric current; and then immersing said matter in a solution consisting of water, castile soap, and spirits.

10. The process of treating vegetable matter, which consists in subjecting it to the action of a solution containing oxalic acid and a saponaceous substance; then subjecting said solution and matter to the action of an electric current; then subjecting said matter to the action of an oily solution; and then again subjecting the matter to the action of a solution containing oxalic acid.

11. The process of treating vegetable matter, which consists in subjecting it to the action of an acidulated solution containing a saponaceous substance; then subjecting said solution and matter to the action of an electric current; then subjecting said matter to the action of an oily solution; and then subjecting the matter to the action of a solution containing oxalic acid.

12. The process of treating vegetable matter, which consists in subjecting it to the action of an acidulated solution containing a saponaceous substance; then subjecting said solution and matter to the action of an electric current; then subjecting said matter to the action of an oily solution; then subjecting the matter to the action of a solution containing oxalic acid; and then immersing the matter in a solution consisting of water and spirits.

13. The process of treating vegetable matter, which consists in subjecting it to the action of an acidulated solution; then subjecting said solution and matter to the action of an electric current; then subjecting said matter to the action of an oily solution; then subjecting the matter to the action of a solution containing oxalic acid; and then immersing said matter in a solution consisting of water, castile soap, and spirits.

14. The process of treating vegetable matter, which consists in subjecting it to the action of a solution containing oxalic acid and a saponaceous substance; then subjecting said solution and matter to the action of an electric current; then subjecting said matter to the action of an oily solution; and then again subjecting the matter to the action of a solution containing animal grease.

15. The process of treating vegetable matter, which consists in immersing the matter in a solution containing oxalic acid and a saponaceous substance; then immersing said matter in a solution containing animal grease; then removing the matter and drying it; then again immersing the matter in a solution containing oxalic acid; and subjecting the matter to the action of an electric current while in each of said solutions.

16. The process of treating vegetable matter, which consists in immersing the matter in a saponaceous solution; then immersing it in a solution containing animal grease; subjecting the matter to the action of an electric current during such immersion and thereby generating gases; condensing said gases; and collecting in a suitable receptacle the distillate therefrom.

Signed by me at Boston, Mass., this 19th day of October, 1906.

GEO. D. BURTON.

Witnesses:
EDNA C. CLEVELAND,
WALTER E. LOMBARD.